United States Patent

King et al.

[11] Patent Number: 4,679,676
[45] Date of Patent: Jul. 14, 1987

[54] OVERRUNNING CLUTCH CAGE WITH SIMPLIFIED MANUFACTURE

[75] Inventors: Donald J. King, Huron; Frederick E. Lederman, Sandusky, both of Ohio

[73] Assignee: General Motors Corporation, Detroit, Mich.

[21] Appl. No.: 872,854

[22] Filed: Jun. 11, 1986

[51] Int. Cl.⁴ .................. F16D 41/06; F16C 33/46
[52] U.S. Cl. ................... 192/45; 192/45.1; 384/560; 384/905
[58] Field of Search .............. 192/41 A, 44, 45, 45.1; 188/82.8, 82.84; 384/576, 578, 579, 557, 905, 560

[56] References Cited

U.S. PATENT DOCUMENTS

| | | | |
|---|---|---|---|
| 2,591,161 | 4/1952 | Kilian | 384/578 |
| 2,969,267 | 1/1961 | Göthberg | 384/580 |
| 3,356,427 | 12/1967 | Van Wyk | 384/463 |
| 4,054,192 | 10/1977 | Johnson | 192/45 |
| 4,088,211 | 5/1978 | Doller et al. | 192/45 |
| 4,187,937 | 2/1980 | Kitchin | 192/45 |
| 4,435,024 | 3/1984 | Tagawa et al. | 384/576 |

Primary Examiner—Rodney H. Bonck
Assistant Examiner—Richard M. Lorence
Attorney, Agent, or Firm—Patrick M. Griffin

[57] ABSTRACT

A cage assembly for an overrunning clutch is formed with a cage body of molded plastic that is initially unitary, and which can therefore be easily handled. The joinder of metal end rings to the cage body serves to fracture it into a plurality of separate pieces, which are maintained in substantially their original positions by their joinder to the end rings. The completed cage assembly can also, therefore, be handled with the ease of a unitary structure. After installation, the fracture of the cage body allows its separate pieces, which include support portions, to maintain the races of a clutch coaxial to one another, but to operate independently, substantially like a conventional, separate piece cage assembly.

3 Claims, 6 Drawing Figures

OVERRUNNING CLUTCH CAGE WITH SIMPLIFIED MANUFACTURE

This invention concerns overrunning clutches in general and specifically a cage assembly for such a clutch that provides an improved and simplified manufacture and assembly.

BACKGROUND OF THE INVENTION

Overrunning clutches of the type known as concentric control clutches are used when it is desired to maintain a pair of clutch races in coaxial relation without the use of separate bearings. Such clutches have cages that include support portions designed to maintain the annular spacing between the races, thereby maintaining the races substantially coaxial. Although, such cage assemblies may be formed entirely of metal, it is often desirable that the support portions, generally referred to as journal blocks, be formed of plastic. Certain surfaces of the journal blocks will ride upon and slide over a surface of one of the clutch races when the clutch is in the overrunning mode, and plastic has superior desirable frictional characteristics, in addition to its light weight, low cost and moldability. It is also generally desirable that the journal blocks be manufactured as circumferentially separate pieces, rather than as an integral part of a unitary plastic cage assembly. This is so because plastic generally has a far higher coefficient of expansion than metal. A unitary plastic cage that is confined within the annular space between a pair of metal clutch races, may present binding or buckling problems as it more rapidly expands or contracts within that annular space with changing temperature. Separate journal blocks, on the other hand, can move circumferentially toward and away from each other essentially independently, and do not present the problem found with a unitary cage. However, it is inevitably more difficult and expensive to manufacture and assemble a cage assembly having a plurality of separate pieces. Another potential problem with a cage formed as a plastic unitary structure is that it does not provide armored retention pockets for the clutch wedging elements, which are generally metal cylindrical rollers.

Several designs for concentric control cages having separate plastic journal blocks may be found in U.S. patents. For example, the U.S. Pat. No. 4,187,937 to Kitchin, assigned to the assignee of the present invention, shows a roller clutch having a metal end ring with a plurality of circumferentially spaced retention tabs formed integrally therewith. A plurality of separately molded and separately handled plastic journal blocks are then snap fitted to each of the metal end ring tabs to complete the cage assembly. Although this provides a complete and workable structure, it does have the separate piece assembly drawback referred to above. However, the circumferentially separate journal blocks, which can float toward or away from one another independently, do provide better operation under conditions of extreme temperature changes than would a unitary plastic cage. Therefore, the extra assembly cost has been tolerated in the past because of the operational of the separate journal blocks.

SUMMARY OF THE INVENTION

The subject invention provides a roller clutch cage assembly that has the manufacturing ease of a unitary structure, but which has the operational advantage of a cage assembly manufactured from a plurality of separate and independently operating journal blocks. In addition, the embodiment disclosed also provides roller retention pockets that are completely armored by metal.

The preferred embodiment includes a plastic cage body molded as a structure which, at least initially, is unitary. Therefore, during manufacture of the cage assembly, the cage body can be very easily handled. The unitary cage body includes a plurality of circumferentially spaced support portions in the form of journal blocks sized so as to fit closely within an annular space between confronting surfaces of a pair of relatively rotatable clutch races. The journal blocks have a surface that rides upon and slides over one of the confronting surfaces of the races, and thereby maintains the races in coaxial relation to one another when the clutch overruns. The plastic material of which the support portions are molded provides desirable frictional properties. The cage body, during the time that it is handled as a unitary structure, also includes a plurality of connector portions that circumferentially interconnect the journal blocks, and which are also molded of the same plastic material. In the embodiment disclosed, these connector portions are molded in alternating fashion on opposite axial sides of the journal blocks. This configuration of the connector portions allows the cage body to be easily molded by a single pair of mold elements that part along the axis of the cage body. Each connector portion is also molded with a strategically weakened portion, so that it is just sufficiently strong to maintain the journal blocks interconnected only temporarily. In the embodiment disclosed, the connector portions also include a latch portion molded therewith, each proximate to a weakened portion.

The preferred embodiment of the cage assembly also includes a pair of metal end rings adapted to be joined to the cage body latch portions in axially spaced relation, thereby completing the cage assembly. The joined end rings form a plurality of roller retention pockets in cooperation with the journal blocks. In addition, the joinder of the metal end rings acts to fracture the weakened portions and separate the journal blocks circumferentially from one another. However, the joinder of the end rings to the journal blocks also serves to keep the journal blocks substantially in their original circumferentially spaced relation, so that the completed cage assembly may still be handled as a unitary structure. After the completed cage assembly is installed in the annular space between the races, the now separated journal blocks may operate independently, as with a conventional roller clutch.

It is, therefore, a general object of the invention to provide an overrunning clutch cage assembly of the type that retains metal wedging elements and is adapted to be installed in an annular space between confronting surfaces of a pair of rotatable members so as to maintain the rotatable members coaxial that has both the manufacturing advantages of a unitary molded cage assembly and the operational advantages of a cage structure manufactured of separate pieces.

It is another object of the invention to provide such a cage assembly that has a cage body including a plurality of circumferentially spaced support portions adapted to fit closely within the annular space and to slidably engage one of the confronting surfaces when the clutch overruns so as to maintain the rotatable members in coaxial relation to one another, the cage body being formed of a moldable plastic material so as to provide support portions with desirable frictional properties, and which also includes a plurality of connector portions circumferentially interconnecting the support portions and also formed of the moldable plastic material, so that the cage body may be molded as an easily handled unitary structure, with each connector portion being just sufficiently strong to temporarily maintain the support portions interconnected, and which also includes a pair of metal end rings adapted to be joined to the unitary cage body in axially spaced relation, thereby forming a plurality of armored wedging element retention pockets in cooperation with the support portions, and in which the joinder of the end rings acts to fracture the connector portions while maintaining the support portions in substantially their original circumferentially spaced relation, thereby allowing the support portions of the completed cage assembly to operate independently after the cage assembly is installed.

It is yet another object of the invention to provide such a cage assembly in which the connector portions of the cage body are located near alternate axial sides of the support portions so that the cage body may be molded as an easily handled unitary structure by a single pair of mold elements.

It is still another object of the invention to provide such a cage assembly in which the cage body also includes latch portions located such that, as the pair of metal end rings is joined to the latch portions, the weakened portions are fractured, while the joinder maintains the support portions in substantially their original circumferentially spaced relation.

DESCRIPTION OF THE PREFERRED EMBODIMENT

These and other objects and features of the invention will appear from the following written description and the drawings in which.

Figure 1:
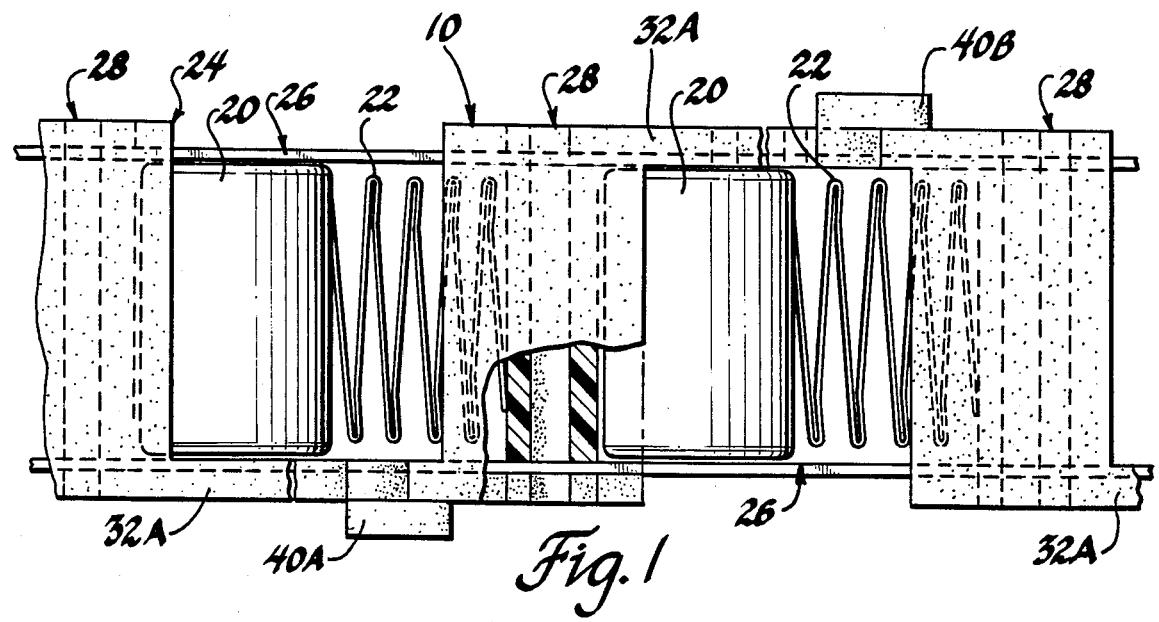
FIG. 1 is a view looking radially into a section of the clutch cage assembly of the invention after it has been completed, but before it has been installed between a pair of clutch races.
Figure 2:
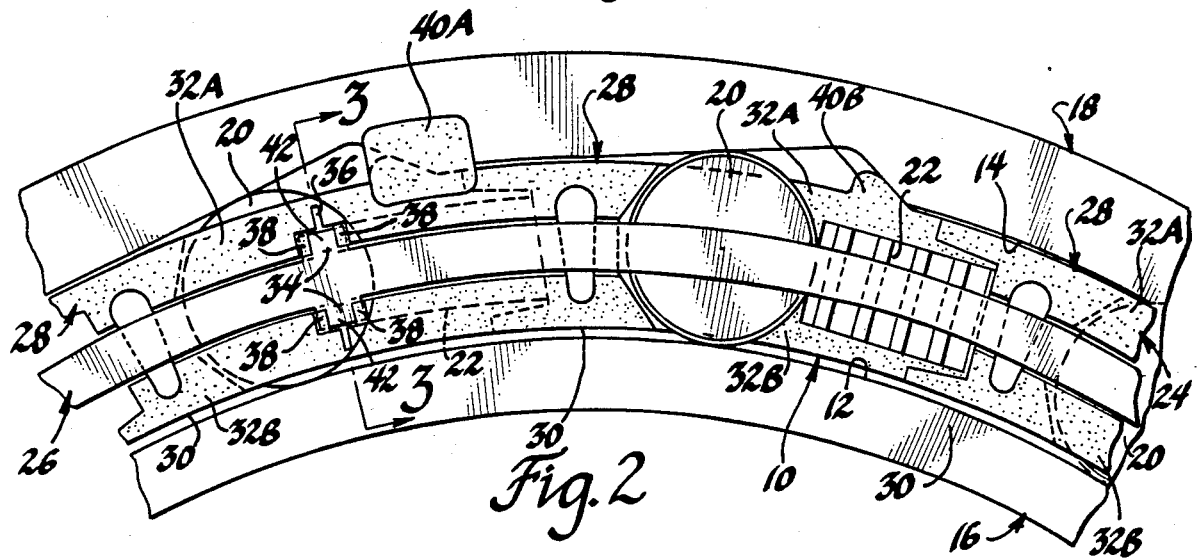
FIG. 2 is a side view of the same portion of the clutch as in FIG. 1, but after installation between a pair of clutch races.

Referring first to FIGS. 1 and 2, a preferred embodiment of the overrunning clutch cage assembly of the invention is designated generally at 10. The cage assembly of the invention 10 is adapted to be installed in an annular space between the confronting surfaces 12 and 14 of a pair of relatively rotatable members, which are an inner and outer clutch race 16 and 18 respectively. The complete overrunning clutch of which the invention forms a part also includes a plurality of metal wedging elements which are retained by the cage assembly 10. These are cylindrical rollers 20 in the embodiment disclosed, and they are energized by a like plurality of springs 22 in conventional fashion. The overrunning clutch allows the races 16 and 18 to rotate relative to one another, or overrun, in one direction only, while they lock up in the other direction. The cage assembly 10 is the type that provides what is often referred to as a concentric control cage, meaning, more accurately, that it is designed to maintain the races 16 and 18 substantially coaxial to one another when they overrun. More will be said about that function below.

Figure 5:
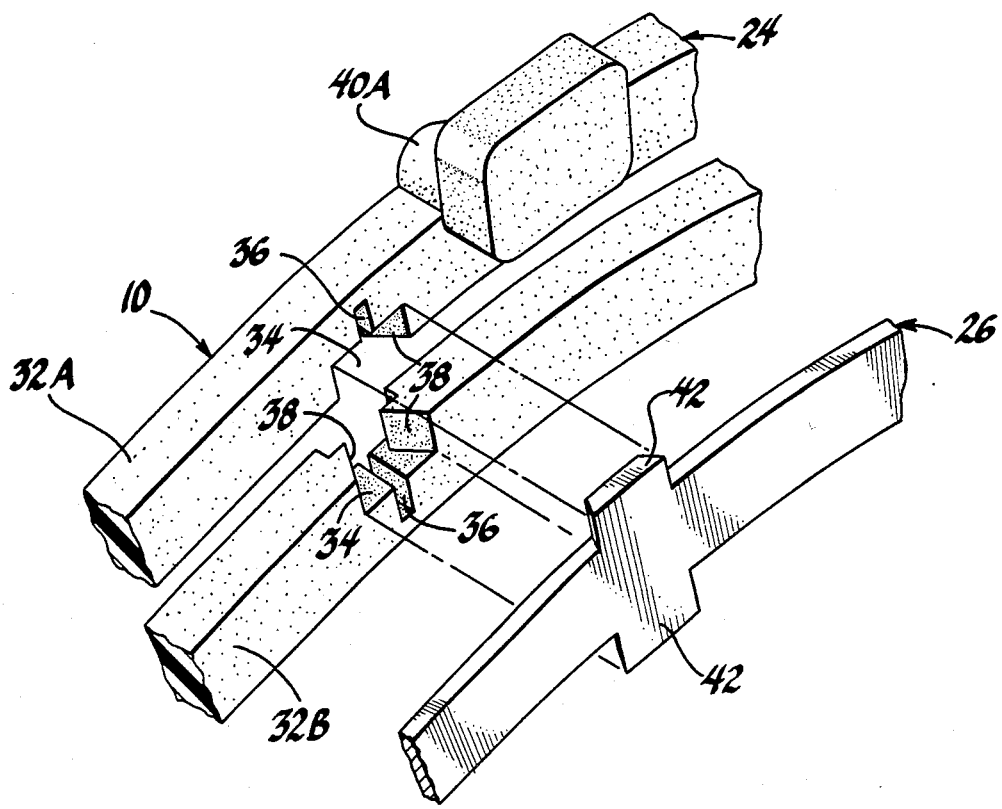
FIG. 5 is a perspective view of a portion of the cage body and of a metal end ring before the final assembly of the cage assembly.
Figure 6:
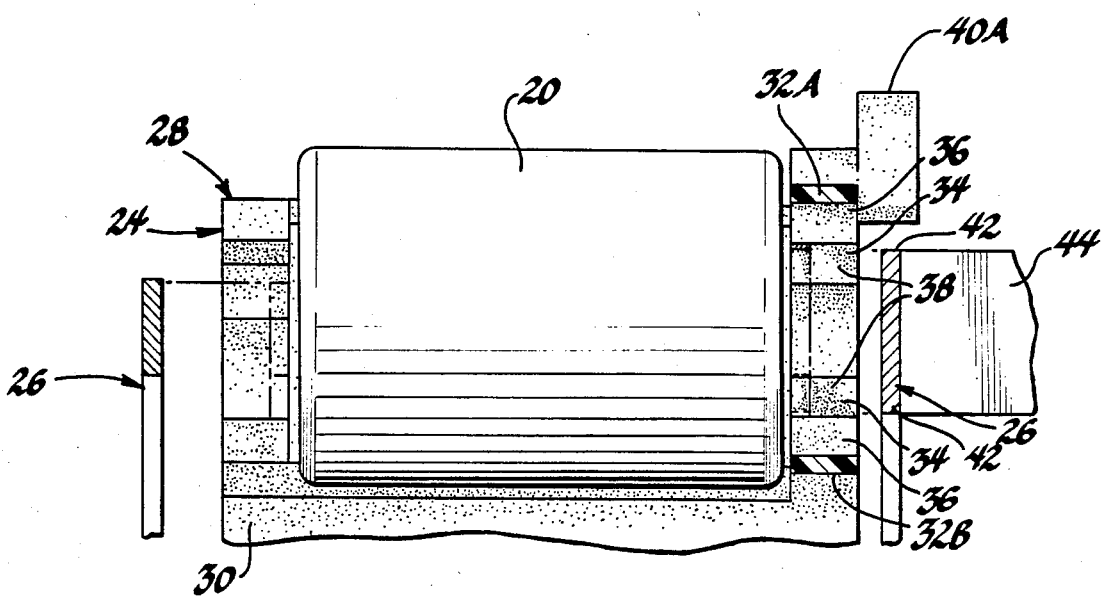
FIG. 6 is an enlarged view similar to FIG. 3 showing the end rings being joined to the cage body.

Referring now to FIGS. 1, 2 and 5, the cage assembly 10 includes three basic structural parts, a cage body designated generally at 24 and a pair of metal end rings, each designated generally at 26. The cage body 24 and end rings 26 are designed to be cooperatively joined to one another at final assembly so as to give a cage assembly with all the operational advantages of a conventional, separate piece concentric control cage assembly, but with the assembly and handling ease of a unitary structure. The cage body 24 will be first described as it exists before final assembly, although it must be kept in mind that only FIGS. 5 and 6 show the cage body 24 in its condition before final assembly. Cage body 24 is molded of a suitable plastic as a structure that is initially unitary, and thus easily handled. Cage body 24 includes a plurality of circumferentially spaced support portions, known as journal blocks, each of which is designated generally at 28. Each journal block 28 is sized so as to fit closely in the annular space between the confronting race surfaces 12 and 14. Each journal block 28 has a lower surface 30 that rides upon and slides over the surface 12 of the inner race 16, thus keeping the races 16 and 18 coaxial when they overrun. The plastic material of which the cage body 24 and journal blocks 28 are formed has good frictional characteristics, besides being light weight and easily moldable.

Referring now to FIGS. 1 and 5, cage body 24 also includes a plurality of connector portions which circumferentially interconnect the journal blocks 28 and are integrally molded therewith. For the particular embodiment 10 disclosed, these connector portions consist of double side rails, each designated generally at 32A and 32B. The double side rails 32A and 32B are integral with alternating axial sides of adjacent pairs of journal blocks 28, around the entire circumference of the cage body 24. This alternating configuration eases the molding process of the cage body 24, allowing it to be molded by a single pair of mold elements that part along the axis of the cage body 24. For the particular embodiment shown, there are fourteen rollers 20 and thus seven double side rails 32A and 32B on each axial side of the cage body 24. The axially alternating configuration of the side rails 32A and 32B also assists in the joining of the end rings 26, as will be described below. The spaces between each of the double side rails 32A and 32B form a plurality of annular segments around the circumference of each side of the cage body 24, all lying on a common annulus sized just slightly larger than the metal end rings 26. The unitary condition of cage body 24 is temporary only, as will appear below.

Referring now to FIGS. 1, 5 and 6, each double side rail 32A and 32B includes a pair of identical and radially opposed slots formed therein, each of which has a stepped configuration with a wider inner portion 34 and a narrower outer portion 36. These slots are molded by the same single pair of mold elements that molds cage body 24. It will be noted in FIG. 5 that the outer portion 36 of each slot extends nearly through its respective side rail 32A and 32B, providing a strategically weakened portion. However, there is sufficient plastic material left to maintain the cage body 24 as a unitary structure that will withstand normal handling during mold removal, assembly and shipping. Thus, the cage body 24 may be handled with the same ease as any other unitary structure. It will also be noted in FIG. 5 that each of the wider slot portions 34 includes a pair of identical and circumferentially opposed ribs 38 that slope axially inwardly and toward one another. Ribs 38 are also molded by the same pair of mold elements that forms the unitary cage body 24, and comprise a latch portion for the end rings 26, as will appear below. Finally, there is a plurality of reaction ears 40A and 40B, seven each molded alternately on opposite axial sides of cage body 24, which tie the completed assembly 10 in conventional fashion to the outer race 18 as the assembly 10 is installed. The final assembly of the constituent parts will be next described.

Figure 4:
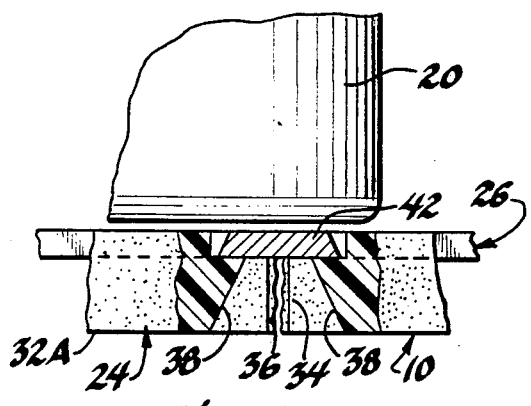
FIG. 4 is a sectional view taken along the line 4—4 of FIG. 3.

As best seen in FIGS. 4, 5, and 6, each end ring 26 includes at seven circumferentially spaced locations thereon a pair of identical and radially opposed rectangular tabs 42. The pairs of tabs 42 are located at equally spaced locations around the end rings 26 so that each pair may fit within a respective pair of slot inner portion 34 with a slight clearance, as best seen in FIG. 4. Each end ring 26 is sized so that as it is aligned with an axial side of the cage body 24, it can fit within the annular spaces between the double side rails 32A and 32B with each pair of tabs 42 engageable with a respective pair of ribs 38, as best seen in FIG. 6. As may also be seen in FIG. 6, a suitable tool 44 may be placed against each end ring 26 at or near the location of the tabs 42. An application of suitable pressure to the tool 44 accomplishes two things. First of all, the tabs 42 push against the sloped ribs 38, pushing them axially inwardly and circumferentially apart from one another. The double side rails 32A and 32B bend axially inwardly as this occurs. Secondly, the slot outer portions 36 extend far enough to sufficiently weaken the double side rails 32A and 32B enough that they fracture as they are bent and the tabs 42 simultaneously snap past the ribs 38. As the tabs 42 move farther into the slot portions 34 and behind ribs 38, the resiliency of the double side rails 32A and 32B, although now broken, will carry them back to their original position, as is best visible in FIG. 4. Although the cage body 24 is now broken into a plurality of fourteen separate sections, the resilient force with which the tabs 42 are latched behind the ribs 38 is sufficient to maintain the journal blocks 28 in substantially their original circumferential position. Therefore, the now completed assembly 10, may be shipped, handled and installed between the races 16 and 18 as a unitary structure. The completed assembly 10 is installed with the conventional push and twist motion that locks the reaction ears 40A and 40B to the outer race surface 14 and ties the cage assembly 10 to the outer race 18.

Referring again to FIGS. 1–4, the completed cage assembly 10, once installed, may operate as would a conventional concentric control clutch manufactured with separately molded journal blocks. In such a conventional structure, the journal blocks are joined to the cage so that there is a noticable rattle in the structure before installation, evidence of a deliberately created "float". Thus, when a conventional separate piece cage has been installed, the journal blocks may move circumferentially toward or away from each other to compensate for the differential in temperature change expansion or contraction that exists between the plastic journal blocks and the metal races. This is the great advantage of a conventional cage structure that makes up for the assembly disadvantage of the separate pieces. The journal blocks 28 of the subject invention 10, however, although molded integrally with an easily handled unitary cage body 24, may operate independently after installation. The force with which the tabs 42 are held behind the ribs 38, best seen in FIG. 4, is not sufficient to prevent the now separated journal blocks 28 from floating circumferentially relative to one another with sufficient freedom to compensate for the temperature differential, as would a conventional separate piece assembly.

Figure 3:
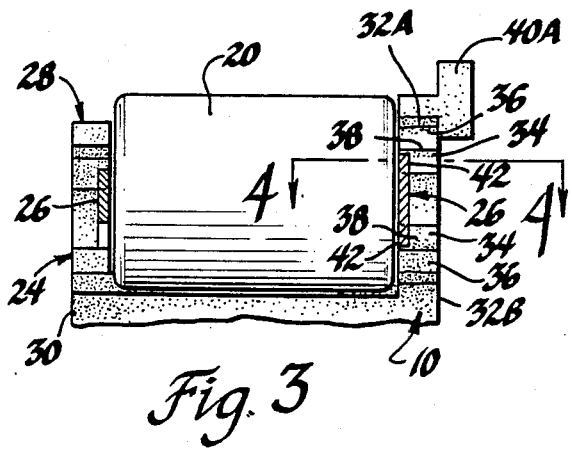
FIG. 3 is a sectional view taken along the line 3—3 of FIG. 2, but not illustrating the clutch races, and showing a roller in elevation.

The particular embodiment 10 disclosed is particularly suited to applications and environments where an extreme temperature drop will have to be tolerated. Thus, as the temperature drops significantly, the journal blocks 28 will tend to shrink radially inwardly to a greater degree than the metal clutch races 16 and 18 and the metal end rings 26. However, the journal blocks 28 are not immovably held in their relative positions, and may move circumferentially apart from one another sufficiently to compensate for the differential in shrinkage. Thus, the cage assembly 10 can conform to the annular space between the races 16 and 18 without binding the journal block surfaces 30 into the inner race surface 12. This movement or float of the journal blocks 28 would be evidenced by a widening of the break illustrated in FIG. 4. Furthermore, sufficient clearance exists between the metal end rings 26 and all surfaces of the side rails 32A and 32B to which the edges of the end rings 26 are adjacent so as to not interfere with this circumferential float, as best seen in FIG. 2. Thus, it will be seen that all the operational advantages of an overrunning clutch cage assembly formed with separate journal blocks may be had, in conjunction with the manufacturing advantage of a clutch formed with a unitary molded plastic cage. An additional advantage is that the metal end rings 26 reside in the annular spaces between the double side rails 32A and 32B and are axially spaced from one another, as best seen in FIGS. 2 and 3. The end rings 26 thereby cooperatively form, in cooperation with the journal blocks 28, a plurality of fourteen metal armored roller retention pockets. The cage assembly 10 is therefore also particularly useful in applications where the axial ends of the rollers 20 may cause wear because of misalignment of the races 16 and 18.

Modifications of the preferred embodiment may be made within the spirit of the invention. Other structures could serve as a suitable latch portion for the metal end rings 26. For example, ribs that extended radially into the annular spaces between the side rails 32A and 32B could snap over the edges of the end rings 26, and no tabs 42 would be needed. Any latch structure that held the end rings 26 strongly enough to maintain the unity of the assembly, but not so strongly as to interfere with the circumferential float described, would serve. Nor is it necessary that the structure of the end rings 26 themselves provide the necessary fracturing force to the connector portions. For example, the tool 44 disclosed above could be widened so as to itself apply sufficient fracturing force to the double side rails 32A and 32B during the joining process of the end rings 26. In addition, the double side rails 32A and 32B could be configured with a larger weakened portion so that as they broke, a small section of material would drop out, leaving a larger break or gap than is shown in FIG. 4. A clutch cage assembly so constructed would be well suited to an application where an extreme temperature increase had to be tolerated, leaving space for the independent journal blocks or cage sections to move circumferentially toward one another to compensate for the expansion differential. Therefore, the invention is not intended to be limited to only the preferred embodiment disclosed.

The embodiments of the invention in which an exclusive property or privilege is claimed are defined as follows:

1. An overrunning clutch cage assembly of the type that retains metal wedging elements and is adapted to be installed in an annular space between confronting surfaces of a pair of rotatable members, said clutch cage providing for ease of manufacture, comprising, a cage body including a plurality of circumferentially spaced support portions adapted to fit closely within said annular space and to slidably engage one of said confronting surfaces when said clutch overruns so as to maintain said rotatable members in coaxial relation to one another, said cage body being formed of a moldable plastic material so as to provide support portions with desirable frictional properties, said cage body also including a plurality of connector portions circumferentially interconnecting said support portions and also formed of said moldable plastic material, so that said cage body may be molded as an easily handled unitary structure, with each connector portion being just sufficiently strong to temporarily maintain said support portions interconnected, and, a pair of metal end rings adapted to be joined to said unitary cage body in axially spaced relation, thereby forming a plurality of armored wedging element retention pockets in cooperation with said support portions, said joinder of said end rings acting to fracture said connector portions while maintaining the support portions in substantially their original circumferentially spaced relation, thereby allowing said support portions of the completed cage assembly to operate independently after said cage assembly is installed.

2. An overrunning clutch cage assembly of the type that retains metal wedging elements and is adapted to be installed in an annular space between confronting surfaces of a pair of rotatable members, said clutch cage providing for ease of manufacture, comprising, a cage body including a plurality of circumferentially spaced support portions adapted to fit closely within said annular space and to slidably engage one of said confronting surfaces when said clutch overruns so as to maintain said rotatable members in coaxial relation to one another, said cage body being formed of a moldable plastic material so as to provide support portions with desirable frictional properties, said cage body also including a plurality of connector portions circumferentially interconnecting said support portions and also formed of said moldable plastic material, said connector portions being located near alternate axial sides of said support portions so that said cage body may be molded as an easily handled unitary structure by a single pair of mold elements, with each connector portion being just sufficiently strong to temporarily maintain said support portions interconnected, and, a pair of metal end rings adapted to be joined to said support portions in axially spaced relation, thereby forming a plurality of armored wedging element retention pockets in cooperation with said support portions, said joinder of said end rings acting to fracture said connector portions while maintaining the support portions in substantially their original circumferentially spaced relation, thereby allowing said support portions of the completed cage assembly to operate independently after said cage assembly is installed.

3. An overrunning clutch cage assembly of the type that retains metal wedging elements and is adapted to be installed in an annular space between confronting surfaces of a pair of rotatable members, said clutch cage providing for ease of manufacture, comprising, a cage body including a plurality of circumferentially spaced support portions adapted to fit closely within said annular space and to slidably engage one of said confronting surfaces when said clutch overruns so as to maintain said rotatable members in coaxial relation to one another, said cage body being formed of a moldable plastic material so as to provide support portions with desirable frictional properties, said cage body also including a plurality of connector portions circumferentially interconnecting said support portions and also formed of said moldable plastic material, said connector portions also being located near alternate axial sides of said support portions so that said cage body may be molded as an easily handled unitary structure by a single pair of mold elements, with each connector portion also including a weakened portion just sufficiently strong to temporarily maintain said support portions interconnected, said cage body also including latch portions located proximate to said weakened portions, and, a pair of metal end rings adapted to be joined to said cage body latch portions in axially spaced relation, thereby forming a plurality of armored wedging element retention pockets in cooperation with said support portions, said joinder of said end rings to said latch portions acting to fracture said weakened portions while maintaining the support portions in substantially their original circumferentially spaced relation, thereby allowing said support portions of the completed cage assembly to operate independently after said cage assembly is installed.

* * * * *